US008433496B2

(12) United States Patent
Carr et al.

(10) Patent No.: US 8,433,496 B2
(45) Date of Patent: Apr. 30, 2013

(54) CONTROL SYSTEM AND METHOD FOR IMPROVING COLD STARTABILITY OF SPARK IGNITION DIRECT INJECTION (SIDI) ENGINES

(75) Inventors: Mark D. Carr, Fenton, MI (US); Michael N. Kotsonas, Highland, MI (US); Michael J. Lucido, Northville, MI (US); Dean R. Kwapis, White Lake, MI (US)

(73) Assignee: GM Global Technology Operations LLC

( * ) Notice: Subject to any disclaimer, the term of this patent is extended or adjusted under 35 U.S.C. 154(b) by 415 days.

(21) Appl. No.: 12/782,086

(22) Filed: May 18, 2010

(65) Prior Publication Data

US 2011/0288746 A1   Nov. 24, 2011

(51) Int. Cl.
*F02M 7/28* (2006.01)
*F02D 41/30* (2006.01)

(52) U.S. Cl.
USPC ........ 701/103; 701/111; 701/112; 123/179.9; 123/481; 123/435

(58) Field of Classification Search ............. 701/103, 701/112, 113; 123/1 A, 299, 304, 575, 435, 123/456, 478, 481, 482, 491, 179.3, 179.4, 123/179.7, 179.9, 179.12, 179.15
See application file for complete search history.

(56) References Cited

U.S. PATENT DOCUMENTS 7,218,010 B2 * 5/2007 Albertson et al. .......... 290/38 R
7,798,128 B2 * 9/2010 Bellistri et al. ............... 123/478

* cited by examiner

*Primary Examiner* — Hai Huynh

(57) ABSTRACT

A control system includes an engine enable module and a fuel control module. The engine enable module determines whether predetermined operating conditions of a spark ignition direct injection (SIDI) engine are satisfied and enables an engine prime mode when the predetermined operating conditions are satisfied. The fuel control module controls a fuel injector to deliver a prime pulse to a cylinder of the SIDI engine when the engine prime mode is enabled. The fuel injector delivers the prime pulse by opening for a pulse width to inject fuel directly into the cylinder when the SIDI engine is stopped.

20 Claims, 3 Drawing Sheets

US 8,433,496 B2

CONTROL SYSTEM AND METHOD FOR IMPROVING COLD STARTABILITY OF SPARK IGNITION DIRECT INJECTION (SIDI) ENGINES

FIELD

The present disclosure relates to control systems and methods for starting spark ignition direct injection (SIDI) engines at cold temperatures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel injection system for a spark ignition direct injection (SIDI) engine is operated at high pressure to spray fuel directly into combustion chambers. A fuel pump supplies high pressure fuel to a fuel rail. Fuel injectors in the fuel rail inject the high pressure fuel directly into the combustion chambers. During a cold start, SIDI engines require a minimum amount of fuel for adequate combustion to increase engine speed and thereby achieve an operating state. The fuel pump and the fuel injectors may not be able to meet fuel demands of the SIDI engine at cold start. A fuel pump and fuel injectors with larger capacities may enable the SIDI engine to start in cold temperatures while respectively increasing engine costs and worsening fuel injection control at low pulse widths.

SUMMARY

A control system includes an engine enable module and a fuel control module. The engine enable module determines whether predetermined operating conditions of a spark ignition direct injection (SIDI) engine are satisfied and enables an engine prime mode when the predetermined operating conditions are satisfied. The fuel control module controls a fuel injector to deliver a prime pulse to a cylinder of the SIDI engine when the engine prime mode is enabled.

A method includes determining whether predetermined operating conditions of a spark ignition direct injection (SIDI) engine are satisfied, enabling an engine prime mode when the predetermined operating conditions are satisfied, and controlling a fuel injector to deliver a prime pulse to a cylinder of the SIDI engine when the engine prime mode is enabled. In the above system and method, the fuel injector delivers the prime pulse by opening for a pulse width to inject fuel directly into the cylinder when the SIDI engine is stopped.

In still other features, the system and method described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
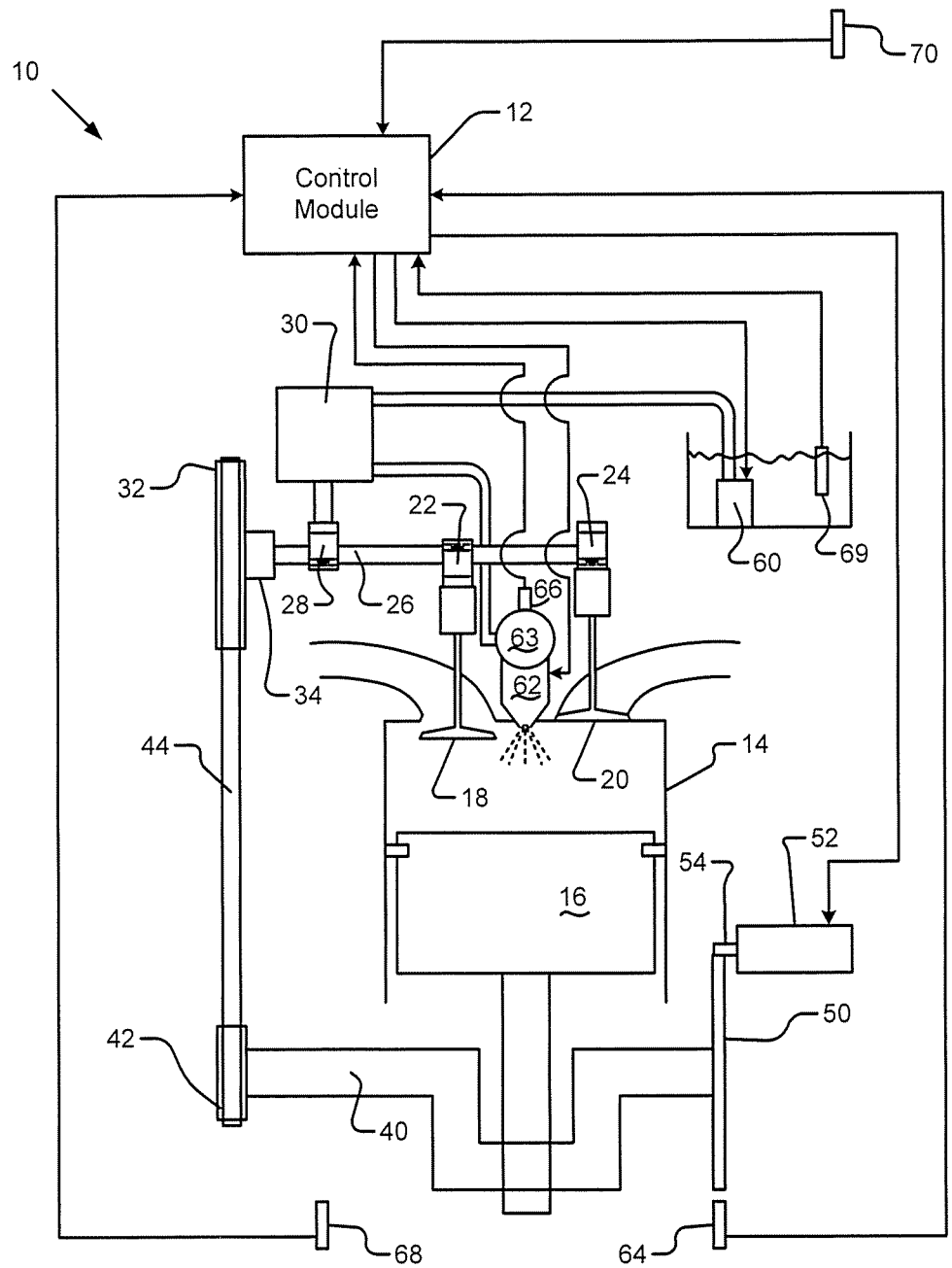
FIG. 1 is a functional block diagram of an exemplary spark ignition direct injection (SIDI) engine according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A control system and method of the present disclosure improves ability to start a spark ignition direct injection (SIDI) engine at cold temperatures, such as temperatures less than −30 degrees Celsius (° C.). A fuel injector is controlled to deliver a prime pulse to one or more cylinders of an engine before the engine is cranked. A prime pulse is an operation performed by a fuel injector in which the fuel injector opens to allow pressurized fuel to flow into a cylinder of an engine and thereby inject fuel into the cylinder when the engine is stopped. The control system and method of the present disclosure determines whether predetermined operating conditions of the engine are satisfied and controls the fuel injector to deliver the prime pulse when the predetermined operating conditions are satisfied.

The predetermined operating conditions that must be satisfied may depend on design characteristics of the engine, including its fuel rail design. A prime pulse may be delivered when the engine is stopped. A prime pulse may be delivered when a fuel rail pressure and an engine coolant temperature are less than predetermined values. A prime pulse may only be delivered to certain cylinders of the engine based on predetermined criteria. After a prime pulse has been delivered to a cylinder, a subsequent prime pulse may not be delivered to the cylinder until the engine is operated for a predetermined period.

A pulse width (i.e., duration) of the prime pulse is determined based on measured operating conditions of the engine. The pulse width may be determined based on the engine coolant temperature, the fuel rail pressure, a fuel ethanol percentage, and a predetermined relationship between the pulse width, the engine coolant temperature, the fuel rail pressure, and the fuel ethanol percentage. Alternatively, the pulse width may be determined based a desired air/fuel ratio, a predetermined mass of air in the cylinder, and a predetermined fuel flow rate of the injector. In either method of determining the pulse width, the pulse width may be determined based on the fuel ethanol percentage, as the desired air/fuel ratio may be determined based on the fuel ethanol percentage.

In this manner, the control system and method of the present disclosure injects fuel into cylinders of an engine before the engine is cranked. The injected fuel wets the walls of the cylinders, which improves the likelihood of combustion in the cylinder when the engine is cranked at cold temperatures. Moreover, the control system and method of the present disclosure enables a SIDI engine having a conventional fuel system to start at cold temperatures that would otherwise require a fuel pump and fuel injectors with increased capacities. This reduces engine costs and improves fuel injection control at low pulse widths.

Referring now to FIG. 1, a spark ignition direct injection (SIDI) engine 10 includes a control module 12 and a cylinder 14 containing a piston 16. An intake valve 18 opens to allow intake air into the cylinder 14. An exhaust valve 20 opens to allow exhaust gas to escape from the cylinder 14. An intake cam lobe 22 and an exhaust cam lobe 24 open and close the intake valve 18 and the exhaust valve 20, respectively. A cam shaft 26 includes the intake cam lobe 22, the exhaust cam lobe 24, and a fuel pump lobe 28 that drives a fuel pump 30. The fuel pump 30 may also be gear driven and/or electric. A cam shaft gear 32 drives the cam shaft 26 via an adjustable cam phaser 34.

The piston 16 reciprocates to drive a crankshaft 40. A crankshaft gear 42 rotates with the crankshaft 40. The crankshaft gear 42 drives the cam shaft gear 32 via a belt or chain 44. In various embodiments, the belt or chain 44 may be replaced with gears. A ring gear 50 is attached to the crankshaft 40. A starter 52 includes a pinion gear 54 that can engage the ring gear 50. The starter 52 can then rotate the crankshaft 40 via the ring and pinion gears 50, 54 to reciprocate the piston 16 and thereby start the engine 10.

The control module 12 sends control signals to the starter 52, a fuel pump 60, and a fuel injector 62. The fuel pump 60 may be an electric, low-pressure fuel pump that sends fuel to the fuel pump 30, and the fuel pump 30 may be a high-pressure fuel pump that sends high-pressure fuel to a fuel rail 63. The fuel injector 62 injects fuel from the fuel rail 63 into the cylinder 14. The fuel injector 62 injects fuel by opening to allow the high-pressure fuel in the fuel rail 63 to flow through the fuel injector 62 and into the cylinder 14.

The control module 12 receives sensor signals from a crankshaft position sensor (CPS) 64, a fuel rail pressure (FRP) sensor 66, an engine coolant temperature (ECT) sensor 68, a fuel ethanol percentage (FEP) sensor 69, and a driver input sensor 70. The CPS 64 detects a speed of crankshaft 40 and provides the crankshaft speed to the control module 12. The FRP sensor 66 detects a pressure in the fuel rail 63 and provides the fuel rail pressure to the control module 12. The ECT sensor 68 detects a temperature of coolant in the engine 10 and provides the engine coolant temperature to the control module 12.

The FEP sensor 69 detects a parameter that may be used to determine a percentage of ethanol in fuel provided to the engine 10. The ethanol parameter may be the fuel ethanol percentage or an oxygen level in exhaust. The FEP sensor 69 provides the ethanol parameter to the control module 12. The FEP sensor 69 may be located in a fuel system or in an exhaust system.

The driver input sensor 70 detects a driver input and provides the driver input to the control module 12. The driver input may be actions taken by a driver to start the engine 10, such as turning an ignition key to a start position or pushing a start button on a key fob. The driver input may be actions taken by a driver to clear a fuel flood in the engine 10, such as turning an ignition key to a start position while depressing an accelerator pedal.

The control module 12 controls the fuel injector 62 to deliver a prime pulse to the cylinder 14 prior to a cold start based on the sensor signals. The control module 12 may deliver the prime pulse when the driver input indicates that an engine start is requested and the ambient temperature is cold, such as less than 30° C. The control module 12 may not control the starter 52 to crank the engine 10 until the prime pulse has been delivered to the cylinder 14. Although only the cylinder 14 is shown, the control module 12 may deliver one or more prime pulses to multiple cylinders of an engine before cranking the engine.

Figure 2:
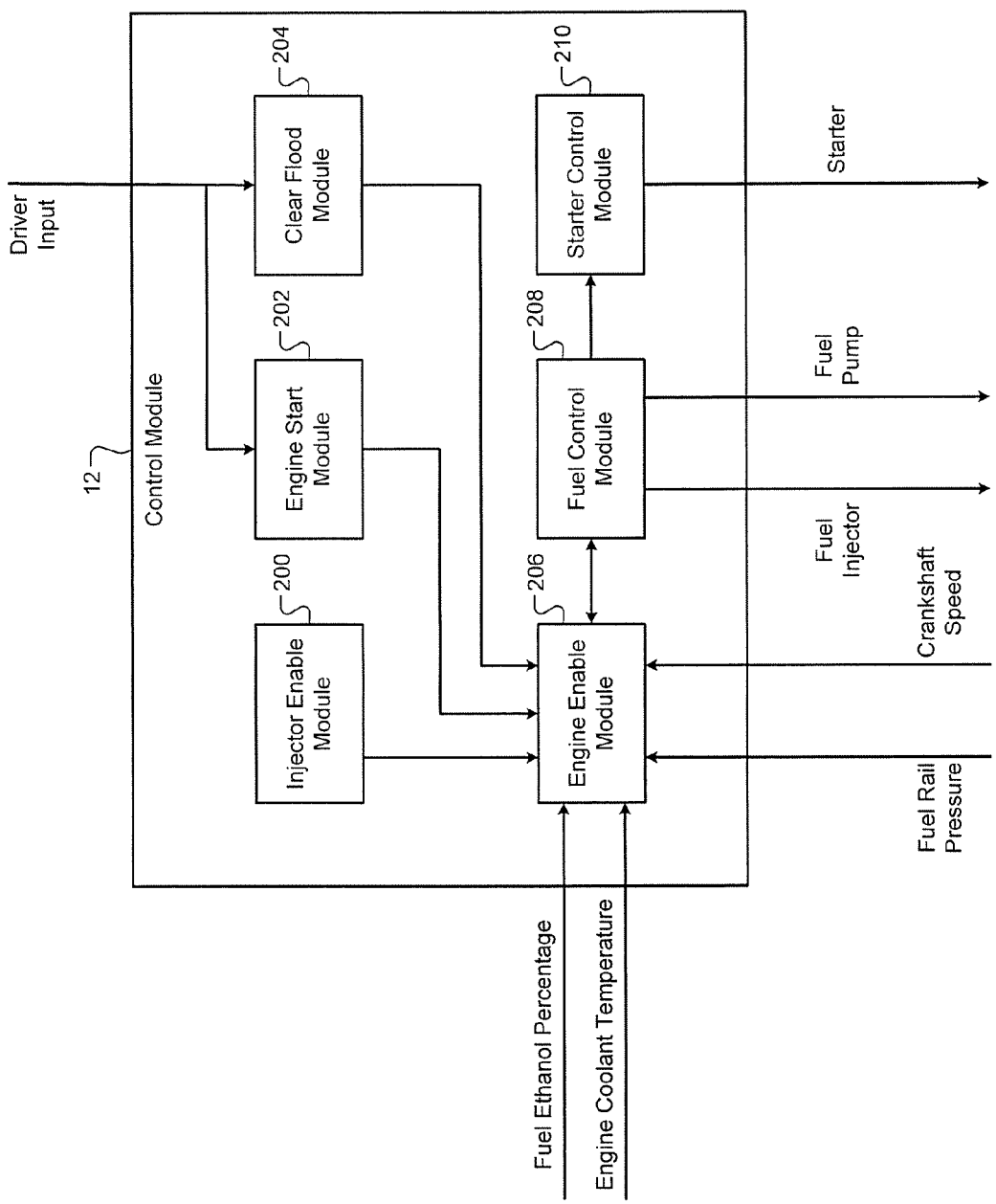
FIG. 2 is a functional block diagram of an exemplary SIDI engine control system according to the principles of the present disclosure.

Referring now to FIG. 2, the control module 12 includes an injector enable module 200, an engine start module 202, a clear flood module 204, an engine enable module 206, a fuel control module 208, and a starter control module 210. The engine enable module 206 enables a prime mode of operating the engine 10 when predetermined operating conditions of the engine 10 are satisfied. The fuel control module 208 controls the fuel injector 62 to deliver a prime pulse to the cylinder 14 when the prime mode is enabled.

The engine enable module 206 determines whether the predetermined operating conditions are satisfied based on signals received from sensors shown in FIG. 1 and from other modules in the control module 12. The engine enable module 206 may receive the crankshaft speed from the CPS 64, the fuel rail pressure from the FRP sensor 66, the engine coolant temperature from the ECT sensor 68, the ethanol parameter from the FEP sensor 69, and the driver input from the driver input sensor 70. The engine enable module 206 may also receive signals from the injector enable module 200, the engine start module 202, and the clear flood module 204.

The engine enable module 206 may enable the prime mode when the crankshaft speed is equal to zero, indicating that the engine 10 is stopped. The engine enable module 206 may enable the prime mode when the engine coolant temperature is less than a predetermined temperature and when the fuel rail pressure is less than a predetermined pressure. Engine coolant temperatures that are less than the predetermined temperature indicate cold start conditions. Fuel rail pressures less than the predetermined pressure indicate that prime pulse delivery may facilitate a cold start without causing hydro lock.

The engine enable module 206 may enable the prime mode for the engine 10 when the injector enable module 200 enables the prime mode for the fuel injector 62. The injector enable module 200 enables the prime mode for the fuel injector 62 based on a stored input. Depending on engine characteristics (e.g., fuel rail design), it may not be desirable to deliver prime pulses to all cylinders. Thus, the stored input is an input that is stored in the injector enable module 200 and that defines which injectors are enabled to deliver a prime pulse. Although FIG. 1 only shows the fuel injector 62, the engine 10 may include multiple injectors that may be enabled by the injector enable module 200 to deliver a prime pulse.

The engine enable module 206 may enable the prime mode when the engine start module 202 indicates that an engine start is requested. The engine start module 202 receives the driver input from the driver input sensor 70 and determines whether an engine start is requested based thereon. As with an engine coolant temperature that is less than the predetermined temperature, an engine start request indicates cold start conditions.

The engine enable module 206 may enable the prime mode when the clear flood module 204 indicates that a clear flood mode is inactive. The clear flood module 204 receives the driver input from the driver input sensor 70 and activates the clear flood mode when the diver input indicates that a clear of a fuel flood in the engine 10 is desired. The engine enable module 206 may enable the prime mode when the clear flood mode is inactive such that fuel is not delivered to the cylinder 14 when removal of fuel from the cylinder 14 is desired.

The fuel control module 208 controls the fuel injector 62 to deliver a prime pulse to the cylinder 14 when the engine enable module 206 enables the prime mode. For an engine having multiple cylinders, the engine enable module 206 may indicate which injectors are enabled and the fuel control module 208 may only control the enabled injectors to deliver a prime pulse. The fuel control module 208 may control the enabled injectors to deliver a prime pulse simultaneously or according to a firing order of the engine. The fuel control module 208 initiates delivery of the prime pulse by sending a control signal to the fuel injector 62 that commands the fuel injector 62 to open for a pulse width.

The fuel control module 208 may receive the fuel rail pressure, the engine coolant temperature, and the ethanol parameter from the engine enable module 206. The fuel control module 208 may determine the pulse width based on the fuel rail pressure, the engine coolant temperature, the fuel ethanol percentage, and a predetermined relationship between the pulse width, the fuel rail pressure, the engine coolant temperature, and the fuel ethanol percentage. Alternatively, the fuel control module 208 may determine the pulse width based on a desired air/fuel ratio, a predetermined air mass in the cylinder 14, and a predetermined flow rate of the fuel injector 62.

The fuel control module 208 may send control signals to one or both of the fuel pumps 30, 60 to ensure that the fuel pumps 30, 60 continue to send fuel to the fuel rail 63 when the engine 10 is stopped and the prime mode is enabled. Low-pressure fuel pumps are typically disabled after an engine is stopped for a predetermined period. The fuel control module 208 may ensure that the fuel pump 60 remains enabled while prime pulses are in progress.

The fuel control module 208 may send a signal to the starter control module 210 indicating when the prime mode is enabled. The starter control module 210 may send a control signal to the starter 52 of FIG. 1 to prevent the starter 52 from engaging when the prime mode is enabled. Alternatively, the fuel control module 208 may indicate when prime pulses are in progress and the starter control module 210 may prevent the starter 52 from engaging when the prime pulses are in progress. This prevents engine rotation while prime pulses are in progress and ensures complete prime pulse delivery.

The fuel control module 208 may send a signal to the engine enable module 206 indicating when a prime pulse is delivered to the cylinder 14. The engine enable module 206 may not enable the prime mode when a prime pulse has been delivered to all cylinders of the engine 10 (i.e., to the cylinder 14). When a prime pulse is delivered to the cylinder 14, the engine enable module 206 may prevent delivery of a subsequent prime pulse to the cylinder 14 until the engine 10 is operated for a predetermined period (e.g., two to five seconds). This prevents undesired fuel injection in the event that an engine does not start.

The engine enable module 206 may disable the prime mode when the predetermined operating conditions are unsatisfied or are no longer satisfied. When the prime mode is disabled while fuel injector 62 is delivering a prime pulse, the fuel control module 208 may control the fuel injector 62 to immediately stop delivering fuel. For example, when the fuel injector 62 is delivering a prime pulse and the clear flood mode is activated, the fuel control module 208 may command the fuel injector 62 to stop delivering the prime pulse.

Figure 3:
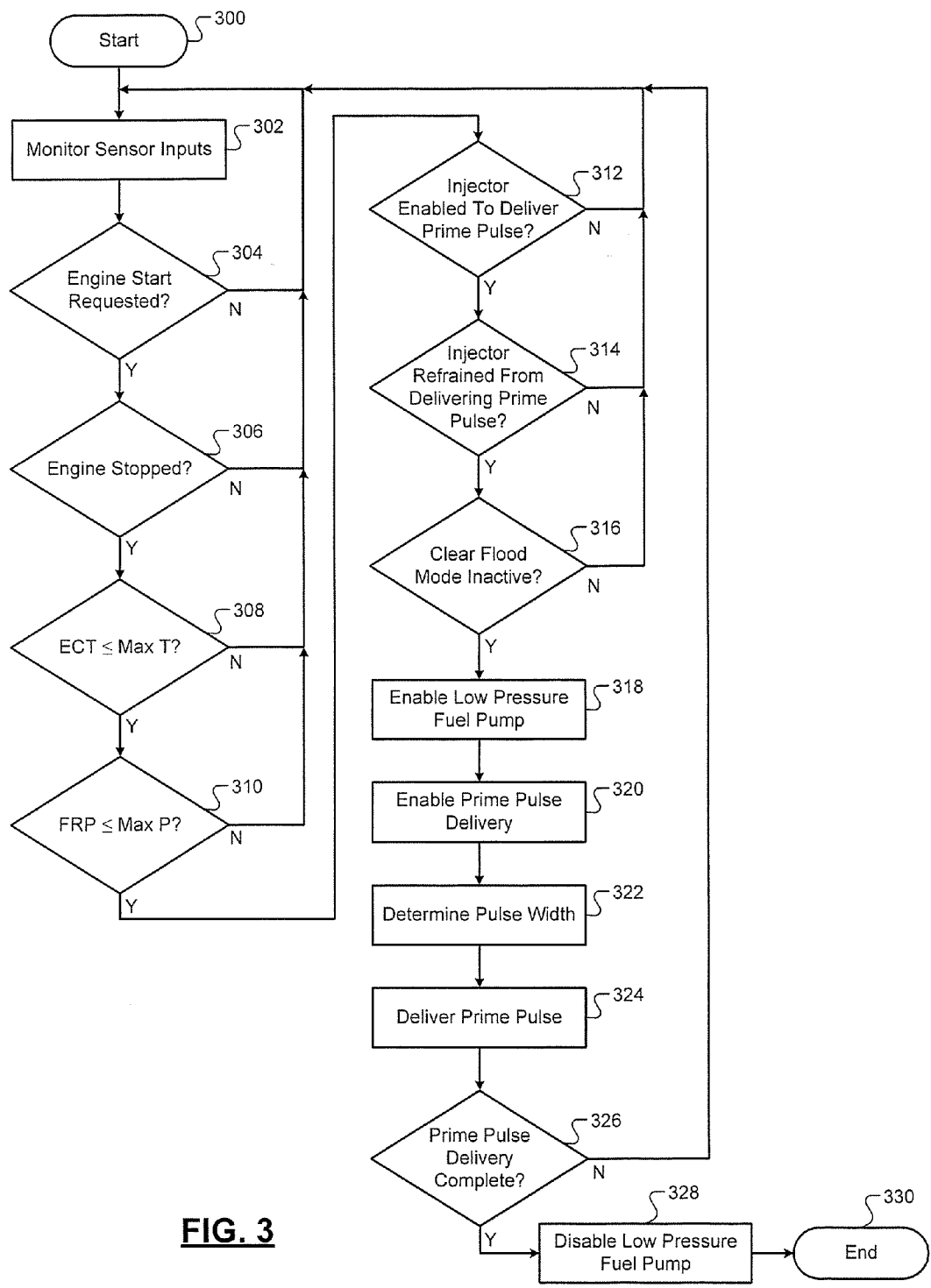
FIG. 3 illustrates a method for starting an SIDI engine at cold temperatures.

Referring now to FIG. 3, a method for starting an SIDI engine at cold temperatures is shown. Control begins at 300. At 302, control monitors sensor inputs indicating operating conditions of an engine. The sensor inputs may include a speed of an engine, a pressure in a fuel rail of the engine, a temperature of coolant in the engine, and input from a driver of the engine.

At 304, control determines whether an engine start is requested. Control may determine whether an engine start is requested based on the driver input. The driver input may be generated when the driver starts the engine. If 304 is false, control returns to 302. If 304 is true, control continues to 306.

At 306, control determines whether the engine is stopped. Control may determine that the engine is stopped when the engine speed is equal to zero. If 306 is false, control returns to 302. If 306 is true, control continues to 308.

At 308, control determines whether the engine coolant temperature is less than or equal to a predetermined temperature. If 308 is false, control returns to 302. If 308 is true, control continues to 310. At 310, control determines whether the fuel rail pressure is less than or equal to a predetermined pressure. If 310 is false, control returns to 302. If 310 is true, control continues to 312.

At 312, control determines whether a fuel injector of the engine enabled to deliver a prime pulse. Control may make this determination based on a stored user input and/or based on test results for a fuel injector output driver. If 312 is false, control returns to 302. If 312 is true, control continues to 314.

At 314, control determines whether the fuel injector has refrained from delivering a prime pulse since the engine was initially stopped. If 314 is false, control returns to 302. If 314 is true, control continues to 316.

Control may determine whether the fuel injector delivered a prime pulse during a previous stop, and if so, whether the engine was operated for at least predetermined period after the previous stop. If the former condition is true and the latter condition is false, control may return to 302. If the former condition is false or the latter condition is true, control may continue to 316.

At 316, control determines whether a clear flood mode is inactive. Control may determine whether the clear flood mode based on the driver input. The clear flood mode may be active when the driver acts to clear a fuel flood from the engine. Otherwise, the clear flood mode may be inactive. If 316 is false, control returns to 302. If 316 is true, control continues to 318.

At 318, control enables a low pressure fuel pump. At 320, control enables prime pulse delivery. At 322, control determines a pulse width. The determined pulse width may be inversely related to the fuel rail pressure and the engine coolant temperature and directly related to a fuel ethanol percentage. At 324, control directs the fuel injector to deliver the prime pulse for the pulse width. Control may direct one or more fuel injectors determined to be enabled at 312 to deliver prime pulses in a firing order.

At 326, control determines whether prime pulse delivery is complete. Prime pulse delivery may be complete when a prime pulse has been delivered to all of the fuel injectors that are enabled. If 326 is false, control returns to 302. If 326 is true, control disables the low pressure fuel pump at 328. Control ends at 330.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
an engine enable module that determines whether predetermined operating conditions of a spark ignition direct injection (SIDI) engine are satisfied and that enables an engine prime mode when the predetermined operating conditions are satisfied; and
a fuel control module that controls a fuel injector to deliver a prime pulse to a cylinder of the SIDI engine when the engine prime mode is enabled, wherein the fuel injector delivers the prime pulse by opening for a pulse width to inject fuel directly into the cylinder when the SIDI engine is stopped.

2. The control system of claim 1, wherein the fuel control module determines the pulse width based on a pressure of fuel in a fuel rail of the SIDI engine, a temperature of coolant in the SIDI engine, a percentage of ethanol in fuel provided to the SIDI engine, and a predetermined relationship between the pulse width, the fuel rail pressure, the engine coolant temperature, and the fuel ethanol percentage.

3. The control system of claim 1, wherein the fuel control module determines the pulse width based on a desired air/fuel ratio, a predetermined mass of air in the cylinder, and a predetermined flow rate of fuel through the fuel injector.

4. The control system of claim 1, wherein:
the predetermined operating conditions include a first condition and a second condition;
the first condition is satisfied when a pressure of fuel in a fuel rail of the SIDI engine is less than a predetermined pressure; and
the second condition is satisfied when a temperature of coolant in the SIDI engine is less than a predetermined temperature.

5. The control system of claim 1, further comprising an injector enable module that selectively enables an injector prime mode based on a stored input, wherein the predetermined operating conditions include a third condition that is satisfied when the injector prime mode is enabled for the fuel injector.

6. The control system of claim 1, wherein:
the predetermined operating conditions include a fourth condition and, when the prime pulse was delivered to the cylinder during a previous stop, the predetermined operating conditions include a fifth condition;
the fourth condition is satisfied when the SIDI engine is stopped and the fuel injector has refrained from delivering the prime pulse to the cylinder since the SIDI engine was initially stopped; and
the fifth condition is satisfied when the SIDI engine is stopped and the SIDI engine was operated for at least a predetermined period after the previous stop.

7. The control system of claim 1, further comprising an engine start module that detects when an engine start is requested based on a driver input, wherein the predetermined operating conditions include a sixth condition that is satisfied when the engine start is requested.

8. The control system of claim 1, further comprising a clear flood module that selectively activates a clear flood mode based on a driver input, wherein the predetermined operating conditions include a seventh condition that is satisfied when the clear flood mode is inactive.

9. The control system of claim 1, further comprising a starter control module that prevents a starter from engaging the SIDI engine when the engine prime mode is enabled, wherein the fuel control module controls a fuel pump to send fuel to a fuel rail when the engine prime mode is enabled.

10. The control system of claim 1, wherein the fuel control module controls the fuel injector to stop delivering the prime pulse when the fuel injector is delivering the prime pulse and the predetermined operating conditions are unsatisfied.

11. A method, comprising:
determining whether predetermined operating conditions of a spark ignition direct injection (SIDI) engine are satisfied;
enabling an engine prime mode when the predetermined operating conditions are satisfied; and
controlling a fuel injector to deliver a prime pulse to a cylinder of the SIDI engine when the engine prime mode is enabled, wherein the fuel injector delivers the prime pulse by opening for a pulse width to inject fuel directly into the cylinder when the SIDI engine is stopped.

12. The method of claim 11, further comprising determining the pulse width based on a pressure of fuel in a fuel rail of the SIDI engine, a temperature of coolant in the SIDI engine, a percentage of ethanol in fuel provided to the SIDI engine, and a predetermined relationship between the pulse width, the fuel rail pressure, the engine coolant temperature, and the fuel ethanol percentage.

13. The method of claim 11, further comprising determining the pulse width based on a desired air/fuel ratio, a predetermined mass of air in the cylinder, and a predetermined flow rate of fuel through the fuel injector.

14. The method of claim 11, wherein:
the predetermined operating conditions include a first condition and a second condition;
the first condition is satisfied when a pressure of fuel in a fuel rail of the SIDI engine is less than a predetermined pressure; and
the second condition is satisfied when a temperature of coolant in the SIDI engine is less than a predetermined temperature.

15. The method of claim 11, further comprising selectively enabling an injector prime mode based on a stored input, wherein the predetermined operating conditions include a third condition that is satisfied when the injector prime mode is enabled for the fuel injector.

16. The method of claim 11, wherein:
the predetermined operating conditions include a fourth condition and, when the prime pulse was delivered to the cylinder during a previous stop, the predetermined operating conditions include a fifth condition;
the fourth condition is satisfied when the SIDI engine is stopped and the fuel injector has refrained from delivering the prime pulse to the cylinder since the SIDI engine was initially stopped; and
the fifth condition is satisfied when the SIDI engine is stopped and the SIDI engine was operated for at least a predetermined period after the previous stop.

17. The method of claim 11, further comprising detecting when an engine start is requested based on a driver input, wherein the predetermined operating conditions include a sixth condition that is satisfied when the engine start is requested.

18. The method of claim 11, further comprising selectively activating a clear flood mode based on a driver input, wherein the predetermined operating conditions include a seventh condition that is satisfied when the clear flood mode is inactive.

19. The method of claim 11, further comprising:
preventing a starter from engaging the SIDI engine when the engine prime mode is enabled; and controlling a fuel pump to send fuel to a fuel rail when the engine prime mode is enabled.

20. The method of claim 11, further comprising controlling the fuel injector to stop delivering the prime pulse when the fuel injector is delivering the prime pulse and the predetermined operating conditions are unsatisfied.

\* \* \* \* \*